Oct. 14, 1969  J. K. FULKS  3,472,123
VERTICAL BROACHING MACHINE
Filed May 26, 1967  3 Sheets-Sheet 1

INVENTOR
JAMES K. FULKS
BY Hauke, Kress, Gifford, & Patalidis
ATTORNEYS

Oct. 14, 1969   J. K. FULKS   3,472,123
VERTICAL BROACHING MACHINE
Filed May 26, 1967   3 Sheets-Sheet 2

INVENTOR
JAMES K. FULKS

BY *Hauke, Kiess, Safford, & Patalidi*

ATTORNEYS

Oct. 14, 1969　　　　　J. K. FULKS　　　　3,472,123
VERTICAL BROACHING MACHINE

Filed May 26, 1967　　　　　　　　　　3 Sheets-Sheet 3

INVENTOR
JAMES K. FULKS

BY Hauke, Kram, Gifford, & Patalski
ATTORNEYS 3,472,123
VERTICAL BROACHING MACHINE
James K. Fulks, Detroit, Mich., assignor to Colonial Broach & Machine Company, Warren, Mich., a corporation of Delaware
Filed May 26, 1967, Ser. No. 641,533
Int. Cl. B23d 37/00
U.S. Cl. 90—95          8 Claims

ABSTRACT OF THE DISCLOSURE

A vertical broaching machine having a pair of balanced broach handling fixtures arranged to reciprocate between downward cutting and upward return strokes. The fixtures have drive rams which are interconnected by a common drive pinion. Rotation of the pinion simultaneously raises one fixture in a non-cutting return stroke while driving the companion fixture in a downward cutting stroke.

Machines for broaching internal and external surfaces are disclosed.

A track and carriage arrangement mounted on the frame of the external broaching machine provides means for moving the broaching tool from its handling fixture above the work station to a lateral position for replacement.

BACKGROUND OF THE INVENTION

Field of the invention

This invention relates to broaching machines and more specifically to a vertical broaching machine having a pair of broach handling fixtures which are reciprocated in opposite directions through their cutting and return strokes by a common drive pinion.

Description of the prior art

Broach handling fixtures of vertical broach machines are conventionally mounted for movement between raised and lowered positions and include upper and lower broach handling fixtures and a drive ram member connected to a reversing drive system. The drive system is arranged so that an elongated broaching tool carried by the upper and lower handling fixtures is reciprocated between a cutting stroke in one vertical direction wherein it performs a surface-finishing operation on a workpiece and a non-cutting return stroke in the opposite vertical direction.

Rack and pinion drive systems are normally employed to produce precision work with very close tolerances. Conventionally the rack forms a part of the drive ram and with the drive pinion connected to reversing drive means and meshed with the rack. When the pinion is rotated in one direction, the handling fixtures and broaching tool are raised. Reversed rotation of the pinion lowers the handling fixtures and the broaching tool.

A drawback with conventional broaching machines employing a rack and pinion system for reciprocation of the broaching tool, the ram and the broach handling fixtures is that the massive weight of these components requires that the drive means deliver a very high torque through the drive pinion to raise the broaching tool and its associated moving components to their uppermost position.

It is the broad purpose of the present invention to provide a pair of counterbalanced vertically mounted broach handling fixtures driven by a common drive pinion arranged to reciprocate the fixtures in opposite directions so that the energy required to raise one handling fixture and its tool in an upward stroke is supplied by the release of the potential energy of the companion broach handling fixture and its tool descending in a downward stroke.

SUMMARY OF THE INVENTION

The preferred embodiment of the present invention, which will subsequently be described in greater detail, takes the form of a base supporting an upright frame having a pair of spaced apart vertical guideways. Each guideway is associated with a workpiece supporting fixture mounted on the base. An upper broach handling fixture is mounted for an up and down movement in each of the guideways. A ram, connected to each upper handling fixture, supports a broach pulling mechanism arranged to engage the leading end of an internal broaching tool moving in a downward cutting stroke after its leading end has descended through the rough finished hole of the workpiece.

Each ram has a vertical drive rack meshed with a common drive pinion connected to a reversing drive means. When the pinion is rotated in a first direction, one of the drive rams is raised in a non-cutting stroke while the opposite drive ram is driven downwardly with its broach in surface-finishing engagement with the workpiece. At the completion of a cutting stroke, the cycle is reversed with the pinion rotated in the opposite direction so that the lower drive ram and its broaching tool are returned to their raised position while the upper drive ram and its tool are driven downwardly in the cutting stroke.

It can be seen that a broach handling fixture and its tool disposed in their raised position possess potential energy because of their position. As the handling fixture and its tool descend from their raised position, this potential energy of position is transferred through kinetic energy to the interconnected upwardly moving handling fixture and tool. This counterbalanced arrangement reduces the required power input to the machine to that which is necessary to perform the actual work of cutting the workpiece.

An alternative embodiment of the invention employs a pair of external surface broaching tools arranged to reciprocate between upward return strokes and downward cutting strokes with the two broaching tools driven in opposite directions by a common drive pinion.

It is difficult procedure to replace an external broaching tool mounted in its raised working position on the broaching machine. The reasons are two-fold. First, external broaching tools characteristically have a substantial weight. Secondly, at the end of its return stroke, the tool is in a raised position above the work platen and various workpiece locating fixtures which interfere with the replacement activity. Tool transfer means are therefore provided in the alternative embodiment of the invention for readily transferring the broaching tool from its normal position at the work station and above the work platen to a lateral position where the broaching tool clears the work station and is readily accessible for handling and replacement.

The tool transfer means comprises a horizontal track mounted to the frame of the machine above the raised position of the tool and a carriage mounted on the track. The carriage is movable between a first position above the work station wherein a set of chucks engage the broaching tool and a second position horizontally spaced from the work station where the broaching tool is readily accessible to the operator and lowered from its raised position.

It is therefore an object of the present invention to provide an improved vertical broaching machine having a pair of reciprocally mounted broach handling fixtures interconnected by a common driving element arranged to move one of the broach handling fixtures in a cutting stroke while moving the companion handling fixture unit in a return stroke.

It is another object of the present invention to provide a vertical broaching machine having a pair of individual broach handling fixtures mounted for reciprocal vertical movement and driven by a reversing drive means through a common drive pinion arranged so that rotation of the drive pinion in a first direction raises one of the broach handling fixtures and its tool while lowering the companion broach handling fixture and its tool, rotation of the drive pinion in a reverse direction lowers the raised broach handling fixture and tool and raises the companion broach handling fixture and tool.

It is a still further object of the present invention to provide a vertical broaching machine having a pair of counterbalanced broach handling fixtures having a similar weight which are mounted for reciprocal up and down movement between raised and lowered positions and driven by a common drive pinion arranged so that the potential energy of one broach handling fixture descending from its raised position is transferred through the drive pinion to the opposite broach handling fixture ascending from its lower position.

It is another object of the present invention to provide a tool transfer means for a vertical broaching machine including a track mounted to the frame of the broaching machine, a carriage movably mounted on the track between a first position adjacent the work station and a second station laterally spaced from the work station and chuck means carried by the carriage for engaging the broaching tool at the work station so that the tool can be moved by the carriage from the work station to the second station.

Still further objects and advantages of the present invention will readily occur to one skilled in the art to which the invention pertains upon reference to the following description.

DESCRIPTION OF THE DRAWINGS

The description refers to the accompanying drawings in which like reference characters refer to like parts throughout the several views and in which.

DESCRIPTION OF THE PREFERRED EMBODIMENTS

Figure 1:
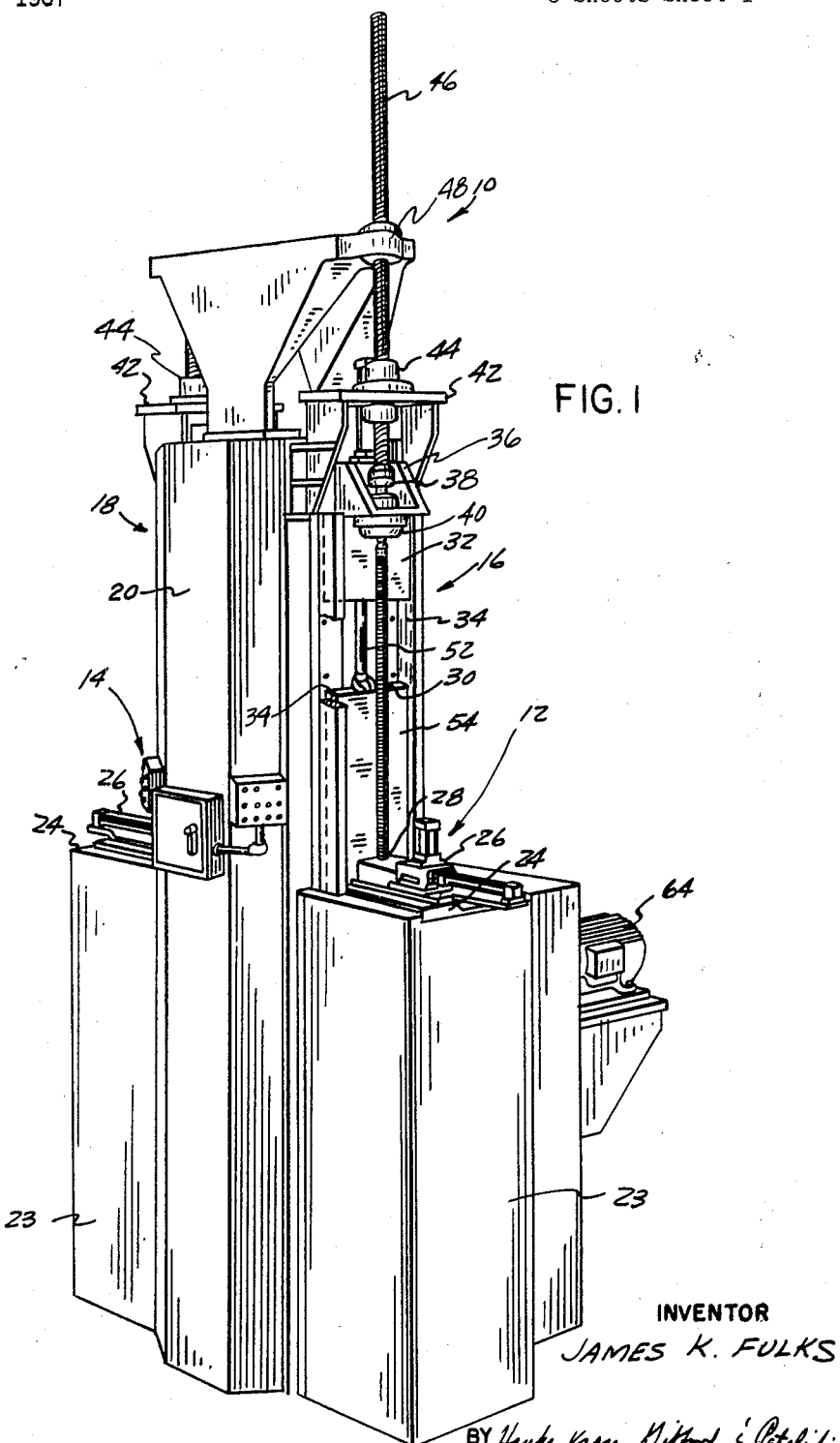
FIG. 1 is a perspective view of a vertical internal broaching machine illustrating a preferred embodiment of the present invention.
Figure 2:
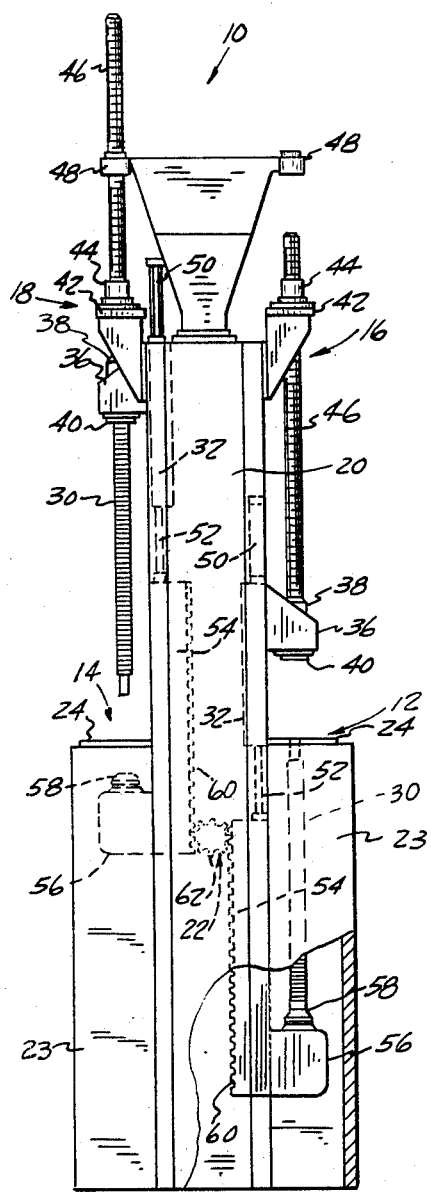
FIG. 2 is a schematic view of the broaching machine of FIG. 1 illustrating the interconnecting drive arrangement between the pair of reciprocating broach handling fixtures and with the workpiece handling fixtures removed for purposes of clarify.
Figure 3:
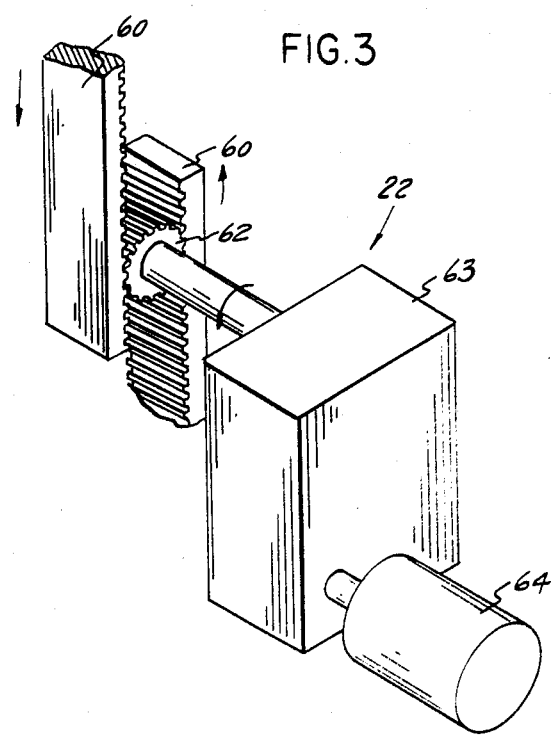
FIG. 3 is a schematic view illustrating the drive system of the machine illustrated in FIG. 1.

Referring now to the drawings, FIGS. 1–3 illustrate a preferred vertical broaching machine 10 having a pair of work stations 12 and 14. The broaching machine 10 comprises a pair of broach handling fixtures 16 and 18 associated with work stations 12 and 14 respectively and mounted for reciprocal up and down movement on an upright frame 20. Broach handling fixtures 16 and 18 are driven by a drive system 22.

For purposes of description, work stations 12 and 14 are similar to one another as are broach handling fixtures 16 and 18 with the drive system 22 being arranged to lower one of the broach handling fixtures in a cutting stroke while simultaneously raising the opposite broach handling fixture in a return stroke and then to alternate this motion.

The frame 20 is supported by a pair of lateral base portions 23. A platen 24 forms a part of each base portion 23 and is associated with each of the work stations 12 and 14. A workpiece supporting fixture 26 is mounted on each platen 24 and supports and locates a workpiece 28 having a rough-finished internal hole which is to be finished by a conventional elongated, tapered broaching tool 30. The broaching tools 30 are supported by the broach handling fixtures 16 and 18.

For purposes of the description the machine 10 is described with reference to a pull-down type of machine wherein the broaching tool 30 descends from a raised position until its lower end is received by the opening in the workpiece 28 which is to be finished and then is engaged by a broach pulling mechanism. The broach pulling mechanism pulls the broaching tool downwardly so that the cutting edges of the broaching tool engages the surface of the workpiece in a surface-finishing relationship. At the end of the cutting stroke, the finished workpiece is removed, the broach handling fixture and the broaching tool are raised to their upper position wherein they are spaced above the platen 24 to permit positioning of the succeeding workpiece by the fixture 26.

The broach handling fixtures 16 and 18, as hereintofore mentioned, are similar and each includes an upper handling slide 32 mounted for guided up and down movement in a pair of spaced apart vertical guideways 34. A bracket 36 extends outwardly from each of the slides 32 and carries a broach supporting fixture 38. The broach supporting fixture 38 includes a conventional chuck 40 adapted to engage the upper end of the broaching tool 30.

The frame 20 has a bracket 42 fixed above the raised position of each of the brackets 36. A fixture 44, mounted on each bracket 42 and preferably comprising a ball screw arrangement receives a lead bar 46 having a continuous helical thread. The lower end of the lead bar 46 is engaged by the fixture 38 so that the lead bar 46 moves up and down as a unit with its associated broach handling fixture. As the lead bar 46 advances through the fixture 44 in its downward stroke it rotates and in turn causes the chuck 40 and the broaching tool 30 to rotate in their downward cutting stroke. This arrangement has particular advantages in achieving a finished internal helical surface in the workpiece 28. The lead bar 46 can be disconnected from the fixture 38 when the broaching tool 30 is not intended to rotate.

The upper end of the lead bar 46 is received by a guide fixture 48 mounted on frame 20 which functions to stabilize the upper free end of the lead bar 46 in the raised position of its broach handling fixture.

A hydraulic cylinder 50 fixed to each of the handling slides 32 provides means for moving each handling slide independently of its drive ram member 54. A link 52 provides a connection between each handling slide 32 and its drive ram 54. The rams 54 are also slidably supported in the guideways 34 so that each upper handling slide 32 and its ram 54 move up and down as a unit during a major portion of their cutting and return strokes.

A broach pulling mechanism 56. FIG. 2, is carried at the lower end of each ram 54 and has a broach pulling chuck 58 aligned with the chuck 40 carried by each upper handling slide 32. It can be seen that the chucks 40 and 58 are vertically spaced apart from one another a sufficient distance to accommodate the broaching tool. Preferably means (not shown) are provided for adjusting the distance between the rams 54 and the upper handling slides 32 to accommodate broaching tools of different lengths.

Each of the rams 54 has a drive rack 60. The drive racks 60 are disposed in a spaced apart opposed relationship and meshed with a drive pinion 62. The drive pinion 62 is supported for rotation about a horizontal axis by the frame 20 and, as best seen in FIG. 3, is driven through a reduction gear unit 63 by a variable speed, reversing motor 64. When the motor rotates the pinion 62 in a clockwise direction as viewed in FIG. 2, the broach handling fixture 16 moves in a downward cutting stroke and the broach handling fixture 18 moves upwardly in a return stroke. At the end of the cutting stroke of the broach handling fixture unit 16, and upon reversal of the output of the motor 64, the pinion 62 rotates in a counterclockwise direction so that the broach handling fixture 16 is raised in a return stroke and the companion broach handling fixture 18 is driven downwardly in a cutting stroke.

The complete work cycle of each broach handling fixture is best illustrated in FIG. 2. The upper handling slide 32, the broaching tool 30 and the ram 54 move in a downward cutting stroke until stop means (not shown) terminate the downward movement of the upper handling slide 32 as the upper end of the broaching tool 30 approaches the workpiece 28.

The upper end of the broaching tool 30 is disconnected from the chuck 40 so that the ram 54 and the broaching tool 30 continue downwardly independently of the upper handling slide 32 with the free upper end of the broaching tool 30 passing through the finished hole in the workpiece 28. The finished workpiece is then removed from the platen 24.

Each ram 54 commences its upward return stroke independently of the upper handling slide 32 until the free upper end of the broaching tool 30 has been received by the chuck 40. The ram 54 and upper handling slide 32 continue their return stroke as a unit with the broaching tool 30. At the end of the return stroke of the ram 54 the chuck 58 is disconnected from the lower end of the broaching tool 30 the upper handling slide 32 and the broaching tool 30 continue upwardly under control of the hydraulic cylinder 50 and independently of the ram 54 until the lower end of the broaching tool is spaced above the platen 24. An unfinished workpiece is mounted in the workpiece supporting fixture 26. The upper handling slide 32 commences its downward movement independently of the ram 54 until the lower end of the broaching tool 30 has been received by the unfinished workpiece 28 and engaged by the pulling chuck 58. The upper handling slide 32, the broaching tool 30 and the ram 54 then continue downward in a cutting stroke.

It can be seen that because of the symmetrical mounting arrangement of the broach handling fixtures 16 and 18, the weight of these fixtures and their broaching tools 30 move in a counterbalanced relationship so that the actual power input by the motor 64 is essentially only that which is necessary to perform the actual cutting work on the workpiece 28.

Figure 6:
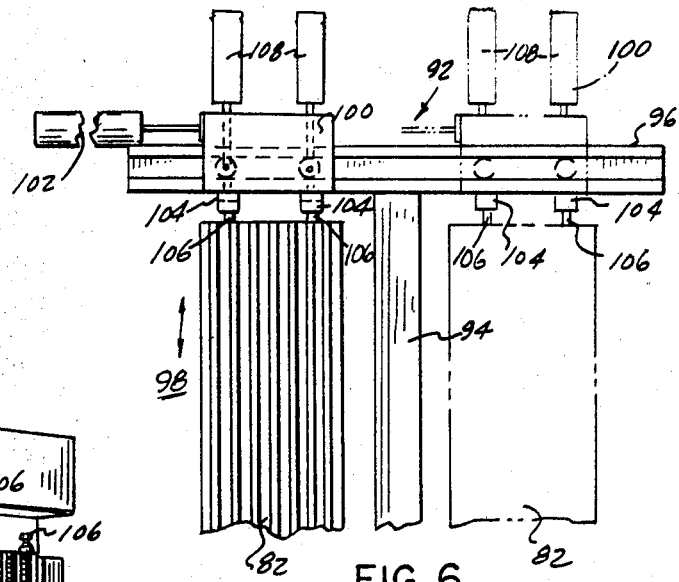
FIG. 6 is a schematic view illustrating the broach transfer means mounted on the machine of FIG. 4.
Figure 4:
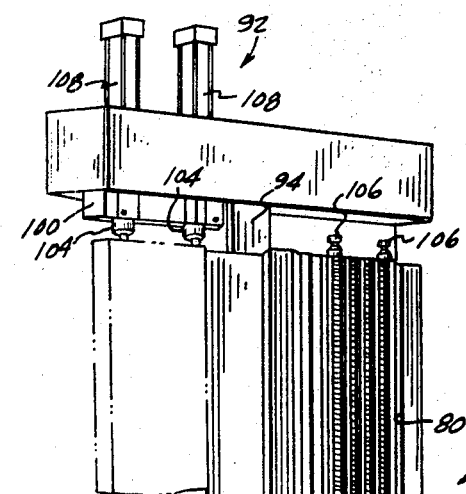
FIG. 4 illustrates a vertical broaching machine for finishing external surfaces and illustrating another embodiment of the invention.
Figure 5:
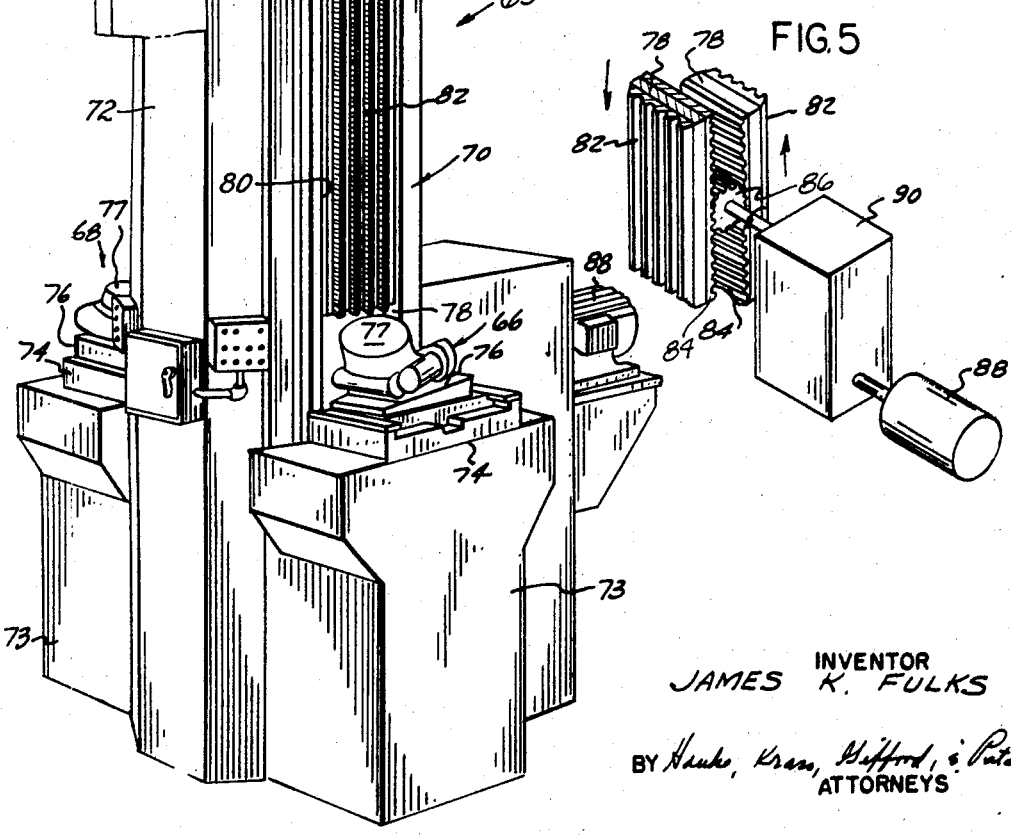
FIG. 5 is a schematic view illustrating the drive system of the machine of FIG. 4.

Now referring to FIGS. 4, 5 and 6, a vertical broaching machine 65 illustrating another embodiment of the invention is adapted to finish the external surfaces of a workpiece.

The broaching machine 65 is similar in arrangement to the aforementioned broaching machine 10 of FIGS. 1 to 3 and has a pair of work stations 66 and 68. A broach handling fixture 70 mounted to an upright frame 72 for vertical, reciprocal movement is associated with the work station 66 and a similar broach handling fixture is associated with the opposite work station 68.

Frame 72 has a pair of lateral base portions 73 each supporting a platen 74 associated with the work stations 66 and 68. A workpiece supporting fixture 76 is mounted on each of the platens 74 and is adapted to position a workpiece 77 having an unfinished external surface.

The broach handling fixtures are similar to one another so that it is to be understood that a description of the broach handling fixture 70 applies to the companion broach unit on the hidden side of frame 72 and associated with work station 68. The broach handling fixture 70 comprises a drive ram member 78 mounted for reciprocal movement between raised and lowered positions in vertical guideways 80 of the frame 72. A surface broaching tool 82 attached by any conventional means to the ram member 78 has a length such that in the raised position of the ram member 78, the lower cutting edges of the broaching tool 82 are spaced above the workpiece 77. As the ram member 78 descends in a cutting stroke, the cutting edges of the broaching tool 82 come into a surface-finishing engagement with the workpiece 77.

FIG. 5 illustrates how a drive rack 84 is carried on the inner side of each of the rams 78. The racks 84 face one another and are in driving mesh with a pinion 86 supported to frame 72 for rotation about a horizontal axis. A reversing motor 88 having output through a reduction gear unit 90 provides a source of rotational power to the pinion 86. As the pinion 86 is rotated in a counterclockwise direction as viewed in FIG. 5, the ram 78 associated with the work station 68 is driven downwardly in a cutting stroke while the ram 78 associated with the work station 66 is raised in a return stroke. At the end of the cutting stroke, the rotational output of the motor is reversed so that the pinion 86 rotates in a reverse direction to drive the ram 78 of the work station 66 in a downward cutting stroke while the ram 78 of the opposite work station 68 is raised in a return stroke.

This alternate embodiment of the invention illustrates how the counterbalanced ram arrangement of the invention can be incorporated in external as well as internal broaching apparatus. The description of the preferred embodiments also illustrate how the power requirements for broaching apparatus can be reduced by employing this counterbalanced configuration.

Now referring to FIGS. 4 and 6, the broaching machine 65 has a broach transfer means 92 which is described with reference to the work station 66. However it is to be understood that a similar broach transfer means is mounted on the top of a column 94 extending upwardly from frame 72 to accommodate the broaching tool associated with the work station 68. The broach transfer means 92 is intended to transfer the broaching tool 82 from its raised position above the platen 74 at the work station 66 to a lateral position wherein the tool clears the work station and is readily accessible to permit the installation of a replacement broaching tool.

The broach transfer means 92 includes a horizontal track 96 having one end directly above the work station 66 and its opposite end adjacent a transfer station 98. It will be understood that the transfer station 98 is horizontally spaced from the work station 66. FIG. 4 illustrates the broaching tool 82 in its raised position above the work station 66, and FIG. 6 illustrates the broaching tool 82 at the transfer station 98. A carriage 100 mounted on the track 96 is movable along the track 96 between a first position above the work station 66 and a second position at the transfer station 98. A hydraulic cylinder 102 connected to the carriage 100 is arranged to drive the carriage 100 between the two positions. The carriage 100 carries a pair of chucks 104 of any conventional configuration which are engageable with a pair of handling sections 106 forming a part of the broaching tool 82. A pair of hydraulic cylinders 108 mounted on carriage 100 actuate the chucks 104 between lowered and raised positions.

In operation, the broaching tool 82 is transferred from its raised position above the work station 66 to the transfer station 98 by arranging the carriage 100 above the work station 66, actuating the chucks 104 to a lowered position wherein they engage handling sections 106, separating the broaching tool 82 from the ram 78, and then actuating the hydraulic cylinder 102 to move the detached broaching tool 82 toward the transfer station 98. At the transfer station 98, the cylinders 108 lower the broaching tool 82 so that it is accessible to the operator. A replacement broaching tool is moved from the transfer station 98 to the work station 66 by reversing the aforementioned procedures.

Having thus described the invention, what is claimed as new is as follows:

1. In a broaching machine, an upright supporting frame, a pair of broach ram slides mounted on said supporting frame for reciprocating movement along a predetermined path between raised and lowered positions; a broaching tool supported by each of said ram slides; a rotary drive pinion member coupled to a source of rotary power, said rotary pinion drive member being connected in a torque transmitting relationship with complementary rack drive sections of each of said pair of broach ram slides and being arranged to simultaneously move one of said broach ram slides from its lowered position toward its raised position.

2. The combination as defined in claim 1, wherein said ram slides are alternately movable between their respective raised and lowered positions in a cutting stroke and in a non-cutting return stroke, and said broach ram slides move in a cutting stroke in a common direction.

3. The combination as defined in claim 2, wherein each of said broach ram slides are movably downwardly in a cutting stroke and upwardly in a return stroke.

4. The combination as defined in claim 2, wherein said broach ram slides and their associated broaching tools have a similar mass so that the torque produced by the combined mass of one of the broach ram slides and its associated broaching tool and acting on the rotary drive member is counterbalanced by the torque developed by the combined mass of the opposite broach ram slide and its associated broaching tool.

5. The combination as defined in claim 4, wherein said broach ram slides are movable in spaced parallel vertical paths.

6. The combination as defined in claim 1, including broach handling fixtures and means mounted on said upright supporting frame, said means coacting with the movement of said broach handling fixtures in a cutting stroke and being operable to rotate an elongated broaching tool carried by said broach handling fixture about its longitudinal axis as it progresses through a workpiece.

7. The combination as defined in claim 1, wherein said ram slides are adapted to carry a broaching tool for finishing the internal surface of the workpiece.

8. The combination as defined in claim 1, wherein said broach ram slides are adapted to carry an elongated broaching tool for cutting engagement with the external surface of a workpiece.

References Cited
UNITED STATES PATENTS

| | | | |
|---|---|---|---|
| 1,437,856 | 12/1922 | Myers | 90—92 |
| 1,507,288 | 9/1924 | Infiorati | 90—93 |
| 2,212,737 | 8/1940 | Hart | 90—95 |
| 2,223,920 | 12/1940 | Rovick et al. | 90—94 |
| 2,644,369 | 7/1953 | Praeg | 90—95 |

GERALD A. DOST, Primary Examiner

U.S. Cl. X. R.

90—63